United States Patent [19]

Huston

[11] 3,968,007

[45] July 6, 1976

[54] NEUTRONIC REACTOR CONSTRUCTION

[75] Inventor: Norman E. Huston, Fullerton, Calif.

[73] Assignee: The United States of America as represented by the United States Energy Research and Development Administration, Washington, D.C.

[22] Filed: Dec. 9, 1952

[21] Appl. No.: 324,885

[52] U.S. Cl. .................................. 176/41; 176/84
[51] Int. Cl.² ........................................ G21C 5/02
[58] Field of Search.................... 204/154.2; 263/46; 176/84, 41

[56] References Cited
UNITED STATES PATENTS 1,807,868   6/1931   Nygaard.......................... 263/46 X

OTHER PUBLICATIONS

Atomics (Great Britain), Feb. 1951, pp. 51, 52.
Atomics (Great Britain), June 1951, pp. 176, 180.
The Science and Engineering of Nuclear Power by C. D. Goodman, vol. I, published by Addison–Wesley Press, Cambridge, Mass., 1947, p. 303.
Modern Refractory Practice by Harbison–Walker Refractories Co. Pittsburgh, Pennsylvania, 2nd ed. 1947, pp. 165, 166, 167.

Primary Examiner—Harvey E. Behrend
Attorney, Agent, or Firm—Dean E. Carlson; Arthur A. Churm

EXEMPLARY CLAIM

1. A neutronic reactor comprising a moderator including horizontal layers formed of horizontal rows of graphite blocks, alternate layers of blocks having the rows extending in one direction, the remaining alternate layers having the rows extending transversely to the said one direction, alternate rows of blocks in one set of alternate layers having longitudinal ducts, the moderator further including slotted graphite tubes positioned in the ducts, the reactor further comprising an aluminum coolant tube positioned within the slotted tube in spaced relation thereto, bodies of thermal-neutron-fissionable material, and jackets enclosing the bodies and being formed of a corrosion-resistant material having a low neutron-capture cross section, the bodies and jackets being positioned within the coolant tube so that the jackets are spaced from the coolant tube.

2 Claims, 9 Drawing Figures

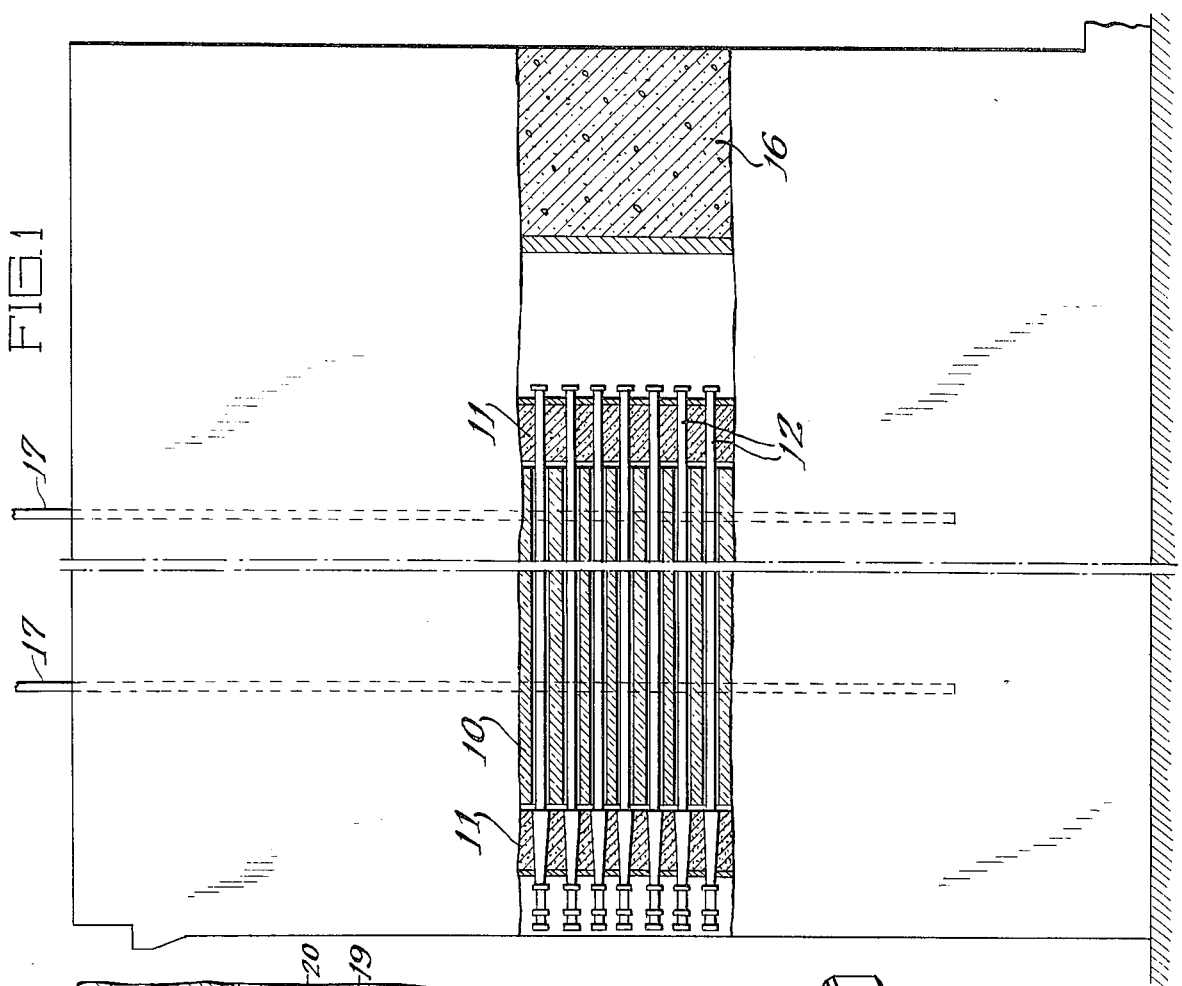
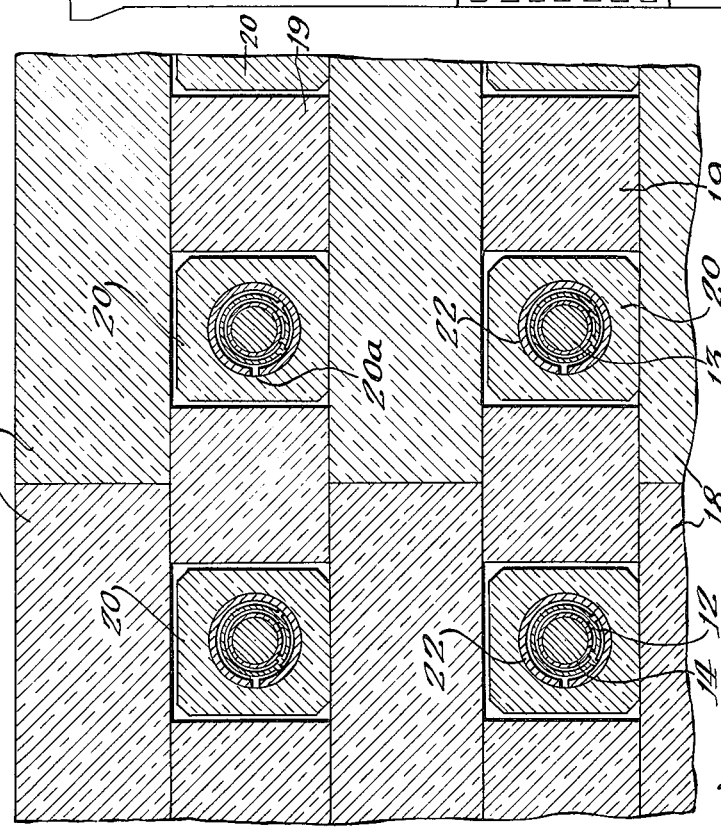
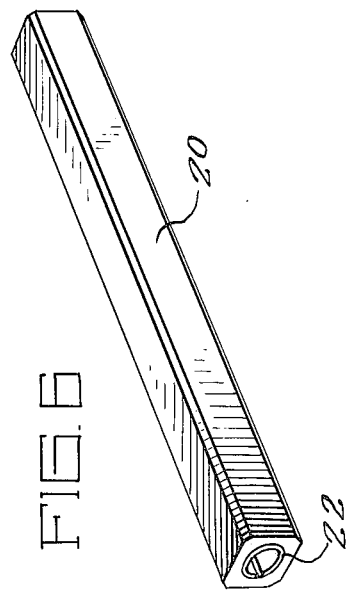

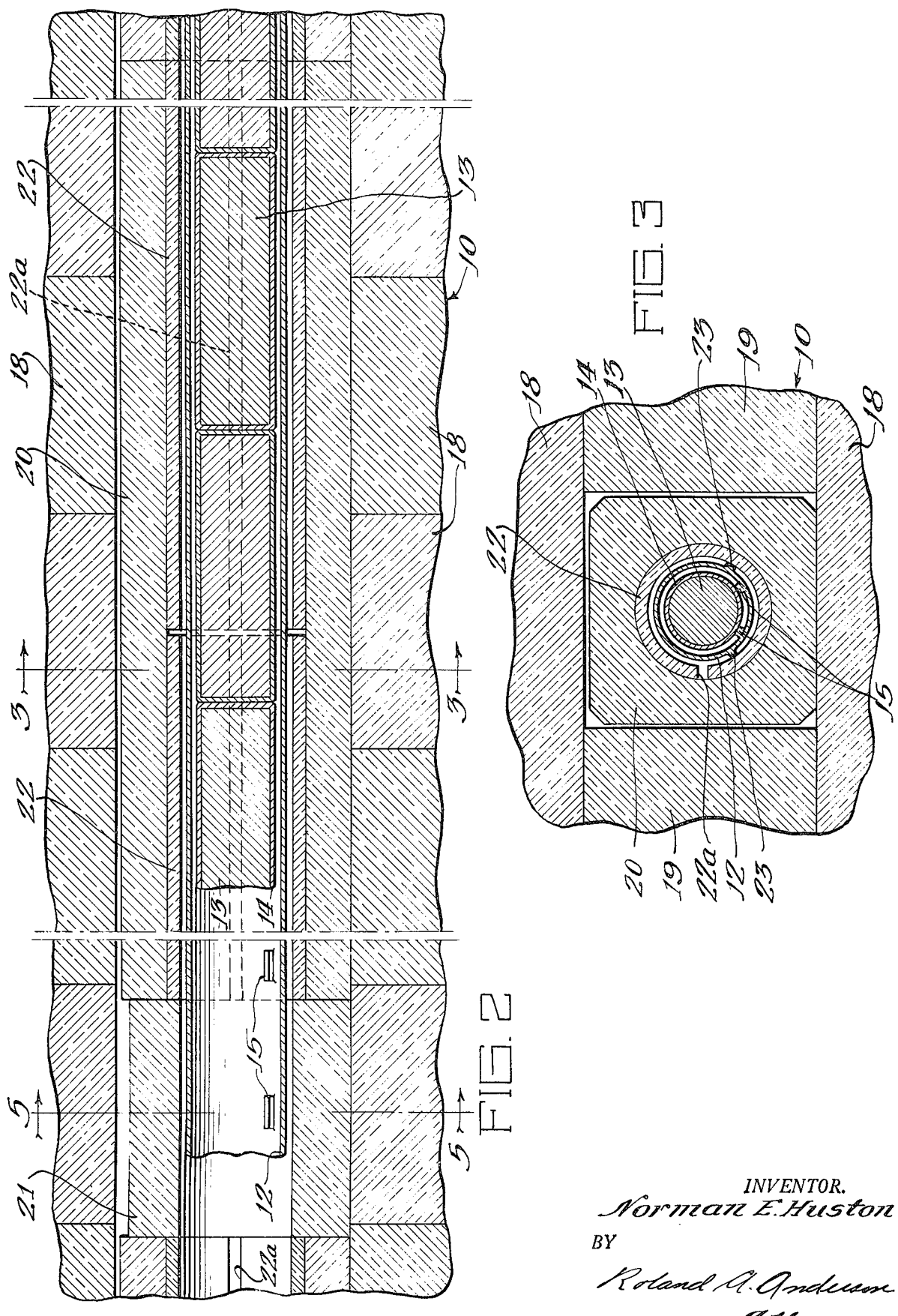

U.S. Patent    July 6, 1976    Sheet 3 of 3    3,968,007
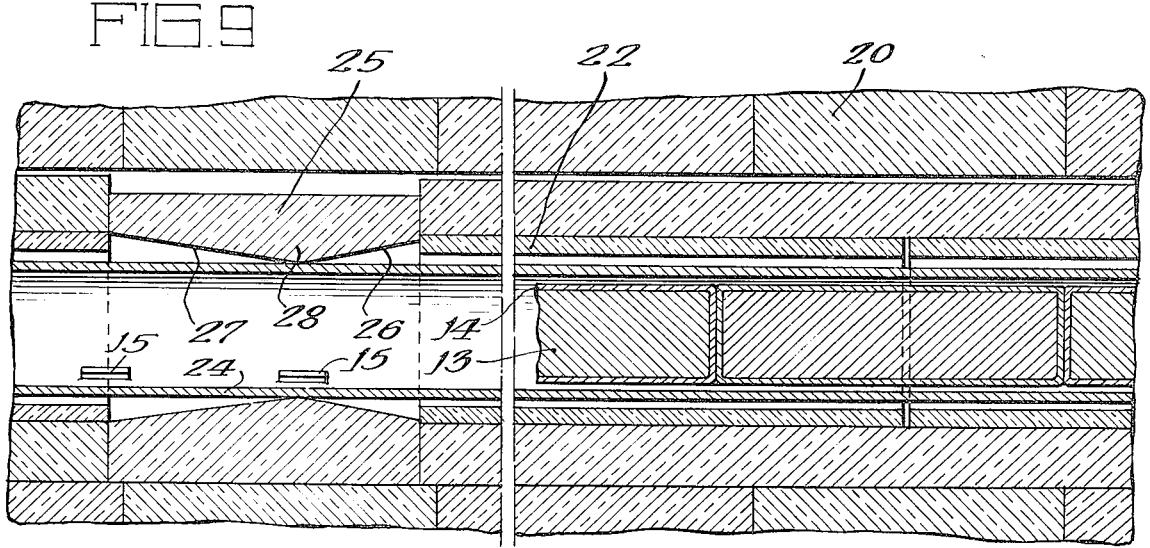
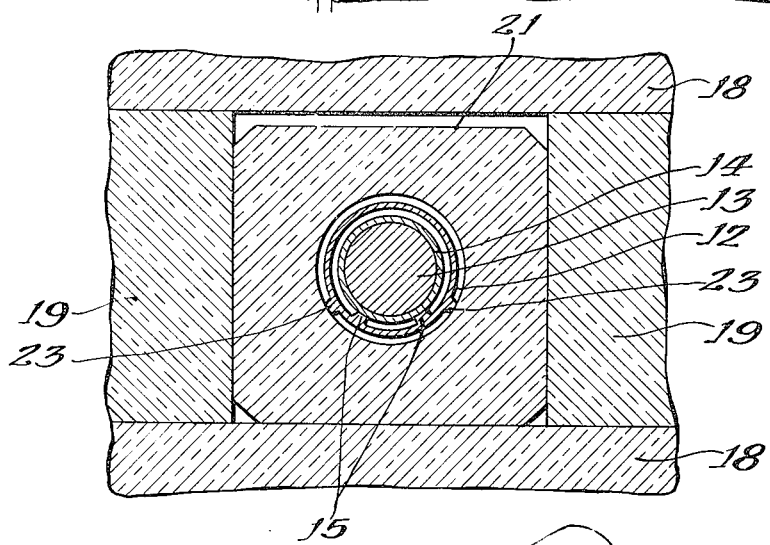
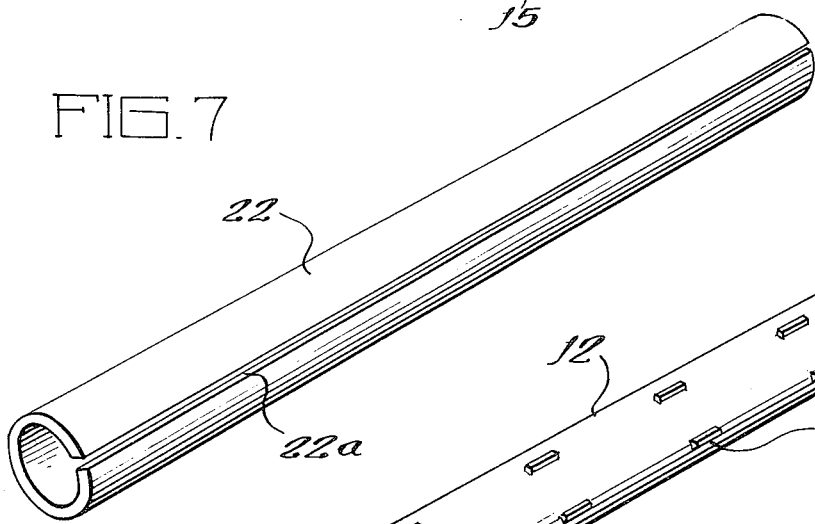
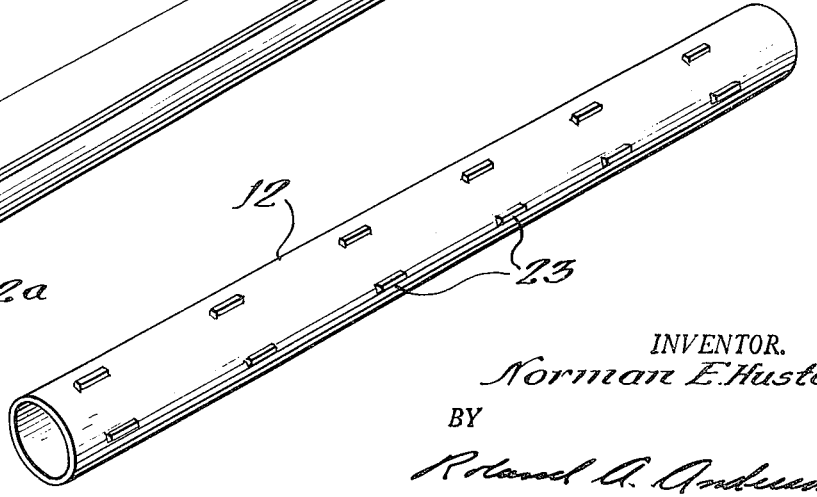
INVENTOR.
Norman E. Huston
BY
Roland A. Anderson
Attorney

NEUTRONIC REACTOR CONSTRUCTION

This invention relates to an improvement in a neutronic reactor, and more specifically to an improvement in the moderator structure of a neutronic reactor.

Graphite has been used as a moderator since the development of the neutronic reactor, and its desirable characteristics for this purpose are now well known in the art. Graphite expands when subjected to high neutron densities, and such expansion is more than is to be expected merely from the high temperatures caused by the high neutron densities. Moreover, the graphite expansion is greater for a given high neutron density, the lower the graphite temperature. Thus in a construction involving graphite blocks through some of which extend coolant tubes containing uranium slugs and their protective casings and providing passageways for a coolant, the graphite blocks containing the coolant tubes will expand more than the other graphite blocks because of being cooler and being subjected to higher neutron densities. It is very important that the blocks through which the coolant tubes extend be prevented from pinching or acting against the coolant tubes so as to diminish the spaces within them for coolant, for the resulting increase in coolant temperature would be likely to interfere with satisfactory operation of the neutronic reactor.

An object of the present invention is accordingly to arrange and construct a moderator block of a neutronic reactor in such a way that it will not pinch or otherwise adversely act against a coolant tube running through the said block.

A further object is to provide improvements in a moderator block through which a coolant tube runs, which improvements involve a multi-part construction for the block across which a pronounced temperature gradient may occur. This allows the block to run hot in spite of the coolant tube and thus to have a limited expansion due to high neutron density.

Another object is to provide a construction for a moderator block containing a coolant tube, which construction makes provision for growth or expansion due to high neutron density in a circumferential direction with respect to the coolant tube. This arrangement minimizes the likelihood of unsatisfactory action by the moderator block against the coolant tube due to growth of the block.

Other objects and advantages of the present invention will become apparent from the specification and drawings, in which:

FIG. 1 is an elevational view of a neutronic reactor in which the present invention is embodied, a portion of the reactor being cut away and in section;

FIG. 2 is a fragmentary sectional view showing a portion of the reactor shown in FIG. 1 in greater detail;

FIG. 3 is a sectional view of a portion of the reactor taken along line 3—3 of FIG. 2;

FIG. 4 is a sectional view similar to FIG. 3 but on a small scale, thus showing more of the structure of FIG. 1;

FIG. 5 is a sectional view of a portion of the reactor taken along the line 5—5 of FIG. 2;

FIG. 6 is a perspective view of a moderator block and a slotted moderator tube positioned therein;

FIG. 7 is a perspective view of the slotted moderator tube;

FIG. 8 is a perspective view of a portion of a coolant tube; and

FIG. 9 is a sectional view generally similar to FIG. 2, showing a modified form of stub block and modified form of coolant tube.

A neutronic reactor constructed according to the present invention may consist of a moderator 10 constructed of solid material, such as graphite, disposed within a radiation shield 11 which surrounds the moderator 10. A plurality of parallel coolant tubes 12 traverse the moderator 10, and the ends of the tubes 12 extend through the shield 11. Within the tubes 12 are disposed a plurality of fuel elements that are constructed with bodies or cores 13 and jackets 14. The bodies 13 are formed of thermal-neutron-fissionable material such as plutonium or natural uranium. The jackets 14 may be formed of any material having a small neutron-capture cross section and suitable physical properties such as a reasonably high melting point and resistance to corrosion. Aluminum has been found to be satisfactory for the jackets 14, and also for the coolant tubes 12, which are provided with internal ribs 15 upon which the fuel elements 13–14 rest. Thus space is provided around the fuel elements and within the coolant tubes for the circulation of a suitable fluid coolant, such as water, which is to limit the temperature of the bodies 14 of fissionable material. The radiation shield 11 is constructed of a material, such as a composite of alternate layers of hydrogenous material and steel, having high neutron and gamma radiation capture cross sections. An additional shield 16 of concrete is disposed farther from the moderator 10 to provide additional protection for operating personnel. Control rods 17 constructed of material having high neutron-capture cross section, such as cadmium or boron steel, are slidably disposed within the moderator 10 and may be withdrawn to increase the rate of neutronic chain reaction. The construction and requirements for neutronic reactors of the type generally described are well understood by the man skilled in the art and form per se no part of the present invention. The patent specification of Edward A. Creutz, Leo A. Ohlinger, Alvin M. Weinberg, Eugene P. Wigner, and Gale J. Young, Ser. No. 574,153, filed Jan. 23, 1945, and Fermi et al. U.S. Pat. No. 2,708,656, dated May 17, 1955, fully describe operative neutronic reactors of the type described above.

The moderator 10 is constructed of a plurality of horizontal layers of rectangular blocks, of which certain alternate layers have blocks 18 extending in one horizontal direction and the remaining alternate layers have solid blocks 19 and tube blocks 10 extending in another horizontal direction normal to the first mentioned horizontal direction. Solid blocks 19 are disposed alternately to tube blocks 20 in the same horizontal layer, which latter blocks have longitudinal passages through which the coolant tubes 12 extend. Blocks 19 and 20 are of square cross section, and tube blocks 20 may be somewhat smaller than solid blocks 19 in cross section as indicated in the drawings, although this is not a requirement. It is contemplated that the blocks 18, 19, and 20 are to be formed of extruded graphite, the direction of extrusion being in the direction of the lengths of the tubes. Thus growth of the blocks due to exposure to high neutron densities originating with the fissionable bodies 13 will occur at right angles to the direction of extrusion and will accordingly involve increase in cross-sectional size rather than increase in length. The tube blocks 20 in any row are separated from one another by short stub blocks 21 which have through passages to accommodate the associated coolant tube 12. As shown in FIG. 5, the horizontal width of each stub block 21 is as great as that of the solid blocks 19 so that the horizontal spacing of solid blocks 19 in a given horizontal layer is maintained. The direction of extrusion of the stub blocks 21 is that of the horizontal width, so that any growth of the stub blocks 21 will not cause a disturbance in the horizontal spacing of the solid blocks 19.

Each tube block 20 is provided with two slotted graphite tubes or sleeves 22, each of which extends for half the length of the longitudinal passage of the tube block, abuts or virtually abuts the other sleeve 22, and has a longitudinal slot 22a. The sleeves 22 are formed by extrusion in the direction of their lengths. The sleeves fit the longitudinal passage in the tube block relatively tightly and receive the associated coolant tube 12. Buttons or blocks 23 on the coolant tube 12 engage the inner surface of the sleeves 22 and maintain the coolant tube 12 in spaced relation to the sleeves 22 so that there is annular space therebetween. FIG. 8 shows the coolant tube 12 upside down so that the buttons or blocks 23 can be seen more clearly. The slotted sleeves 22 do not extend through the stub blocks 21, and so the stub blocks are engaged directly by the buttons or blocks 23 on the coolant tube 12.

Now with special reference to FIG. 3, it is to be observed that the coolant tube 12, through which a coolant flows, is spaced from the tube block 20 by an annular space around the coolant tube and the slotted tube 22. Thus the tube block is shielded from the cooling action of the coolant tube by the annular space and the slotted tube. This means that the tube block is hotter for a given temperature of coolant in the coolant tube than it would be without the annular space or the slotted tube or both. The higher temperature of the tube block causes the tube block to have less expansion due to high neutron density caused by the fissionable bodies 13. This is disclosed more fully in the copending patent application of Alfred A. Johnson and John T. Carleton, Ser. No. 253,908, filed Oct. 30, 1951.

The distinguishing features of the present application are the slotted sleeve 22 and the annular space around the coolant tube 12, which in the modification of FIGS. 2, 3, and 4 is made possible by the external buttons or blocks 23 on the coolant tube and the slotted sleeve 22. The slotted sleeve not only provides another means between the coolant tube and the tube block 20, which means increases the temperature gradient between the coolant in the coolant tube and the tube block, but also constitutes means in which almost the entire portion of the moderator growth due to high neutron density caused by the fissionable bodies 13 may occur. Since the tube 22 has the slot 22a, the growth can occur in a circumferential direction and results in narrowing of the width of the slot. Thus there is substantially no radial growth of the slotted tube 22 and substantially no tendency for the sloted tube to cause the tube block 20 to expand.

In the particular construction described, the tubes 12 are disposed in a square lattice with the center line of each tube spaced from those of adjacent tubes by 8⅜ inches. The solid blocks 18 and 19 have a cross section of 4.18 inches by 4.18 inches. If the tube blocks 20 are smaller in cross section than the solid blocks as actually shown in the drawing, then the cross section of the tube blocks may be 4.06 inches by 4.06 inches. The tube blocks 20 are 4 feet long, and the slotted tubes 22 are 2 feet long. A convenient thickness for the wall of the slotted tubes is ¼ inch, and the slots in the slotted tubes may be 3/16 inch wide. The inner diameter of the slotted tubes is dependent on the outer diameter of the coolant tubes 12 and the size of the gap between the coolant tubes 12 and the slotted tubes 22. With a square-lattice arrangement of the coolant tubes 12 and a spacing of 8⅜ inches between center lines, the outer diameter of the tubes 12 is 1.729 inches, and the thickness of the gap between the coolant tubes 12 and the slotted tubes 22 may vary, depending on the location of the center-line of the particular coolant tube 12 with respect to the center of the moderator 10, and a good representative value of the thickness of the gap is ⅛ inch. Thus the inside diameter of the slotted tubes 22 will be 1.979. The slotted tubes 22 will have a slip-fit with the tube blocks 20. The stub blocks 21 are 4.18 inches in the horizontal direction of cross section (FIG. 5), which is the direction of extrusion, where no growth will occur, and are less, for example 4.00 inches, in the vertical dimension of cross section, where growth will occur. The vertical dimension of 4.00 inches for the stub blocks 21 is somewhat less than the corresponding dimension of 4.06 inches for the tube blocks 20, since the stub blocks will grow more than the tube blocks, because the stub blocks with no slotted sleeves 22 therein will be cooler than the tube blocks. The length of the stub blocks (the horizontal direction of the cross section of FIG. 2) is 4.18 inches.

The coolant in the coolant tubes 12 will cause the slotted sleeve 22 to be definitely cooler than the tube blocks 20, since there will be a definite temperature drop across the abutting unjoined surfaces of the slotted sleeves 22 and the tube blocks 20. Thus the slotted sleeves act to keep the tube blocks 20 at a higher temperature, with the result that there is less growth in tube blocks 20 and damage to them. The growth and damage can be substantially confined to the slotted sleeves 22. The growth for the most part will be circumferential in character and thus be accommodated by the slots 22a in the slotted sleeves. Incidentally, a decrease in thermal conductivity will result from the damage due to neutron action from the fissionable bodies 13, and such decrease will serve to increase the temperature of the tube blocks 20, making them less likely to grow and become damaged.

The gas disposed within the spaces or gaps between the tube blocks 20 and the solid blocks 18 and 19 and between the slotted sleeves 22 and the coolant tubes 12 should have a neutron absorption cross section at least as low as that of the material of the moderator 10, and the gas disposed between the slotted sleeves 22 and the coolant tubes 12 must also have a relatively low thermal conductivity in order to permit substantial temperature gradients to exist across the gaps between the slotted sleeves and the coolant tubes. Helium has been found to be a suitable gas for these purposes.

In the modification of FIG. 9 a coolant tube 24 has no exterior buttons or blocks and is held spaced from slotted sleeves 22 by stub blocks 25. These stub blocks have apertures that taper from each end in the form of cones 26 and 27, which meet in narrow annular regions 28, which engage the coolant tubes 12 to support them. In each stub block 25 the supporting region 28 is nearer one end of the stub block than the other end. The external dimensions of the stub blocks 25 correspond generally to those of the stub blocks 21. The coolant tubes 24 have internal ribs 15 which support fuel elements 13–14 in spaced relation to the coolant tubes 24 as in the case with the coolant tubes 12.

Although only one embodiment of the present invention has been invented, various modifications within the scope of the invention will be apparent to those skilled in the art. The invention is not limited by this embodiment but only by the claims that follow.

What is claimed is:

1. A neutronic reactor comprising a moderator including horizontal layers formed of horizontal rows of graphite blocks, alternate layers of blocks having the rows extending in one direction, the remaining alternate layers having the rows extending transversely to the said one direction, alternate rows of blocks in one set of alternate layers having longitudinal ducts, the moderator further including slotted graphite tubes positioned in the ducts, the reactor further comprising an aluminum coolant tube positioned within the slotted tube in spaced relation thereto, bodies of thermal-neutron-fissionable material, and jackets enclosing the bodies and being formed of a corrosion-resistant material having a low neutron-capture cross section, the bodies and jackets being positioned within the coolant tube so that the jackets are spaced from the coolant tube.

2. The neutronic reactor specified in claim 1, the slotted tubes being one half the length of the blocks having the ducts so that each of the latter blocks contains two slotted tubes.

* * * * *